United States Patent
Fleytman

[11] Patent Number: 5,988,006
[45] Date of Patent: Nov. 23, 1999

[54] METHOD OF MOVING OBJECTS WITH SELF-LOCKING MECHANICAL TRANSMISSION

[76] Inventor: Yakov Fleytman, 2875 Troy Center Dr., Apt. 3028, Troy, Mich. 48084

[21] Appl. No.: 08/353,797

[22] Filed: Dec. 12, 1994

[51] Int. Cl.⁶ ........................................... F16H 1/16
[52] U.S. Cl. ........................................................ 74/425
[58] Field of Search ................... 74/409, 89.14, 74/424.8 R, 425, 441

[56] References Cited

U.S. PATENT DOCUMENTS

| | | | |
|---|---|---|---|
| 2,567,483 | 9/1951 | Hotine | 74/459 |
| 4,261,218 | 4/1981 | Eagan, Sr. | 74/409 |
| 4,679,458 | 7/1987 | Brandenstein et al. | 74/424.8 R |
| 4,685,344 | 8/1987 | Horn et al. | 74/424.8 R |
| 4,989,472 | 2/1991 | James, Sr. et al. | 74/409 |
| 5,063,316 | 11/1991 | E-ming | 74/89.14 |
| 5,239,882 | 8/1993 | Druet | 74/459 |
| 5,387,162 | 2/1995 | Yang | 74/409 |
| 5,392,666 | 2/1995 | Lin | 74/409 |

FOREIGN PATENT DOCUMENTS

| | | | |
|---|---|---|---|
| 1399721 | of 1988 | U.S.S.R. | G05G 19/00 |
| 1401209 | of 1988 | U.S.S.R. | F16H 27/02 |
| 1437212 | of 1988 | U.S.S.R. | B25J 9/12 |
| 1442983 | of 1988 | U.S.S.R. | G05G 19/00 |
| 1486686 | of 1989 | U.S.S.R. | F16H 29/00 |
| 1495110 | of 1989 | U.S.S.R. | B25G 9/00 |
| 1516685 | of 1989 | U.S.S.R. | F16H 27/02 |
| 1603104 | of 1990 | U.S.S.R. | F16H 25/20 |
| 1609646 | of 1990 | U.S.S.R. | B25G 9/00 |
| 1665358 | of 1991 | U.S.S.R. | G05G 19/00 |
| 4717697 | of 1991 | U.S.S.R. | G05G 19/00 |

OTHER PUBLICATIONS

Nicholas P. Chironis, *Mechanisms & Mechanical Devices Sourcebook*, p. 402 (McGraw Hill 1991).

*Primary Examiner*—Tamara L. Graysay
*Assistant Examiner*—David Fenstermacher

[57] ABSTRACT

A method of moving of moving objects with a self-locking mechanical transmission including a driving element and a driven element with a controlling element selected from the driving element and the driven element, the method comprises steps of moving the controlling element until a contact between the driving element and the driven element is established, applying to one of elements a power action so as to push the one element and simultaneously and jointly move the driving element and the driven element in the direction of the established contact between the driving element and the driven element; unloading of the controlling element so as to interrupt a power interaction between the driving element and the driven element.

8 Claims, 4 Drawing Sheets

METHOD OF MOVING OBJECTS WITH SELF-LOCKING MECHANICAL TRANSMISSION

BACKGROUND OF THE INVENTION

The present invention relates to methods of moving objects with a self-locking mechanical transmission, which can be used in linear and rotary drives.

Self-locking mechanical transmission, are well known, such as for example a screw-nut transmission, a worm—worm wheel transmission, etc. The movement with the screw-nut transmission is performed in the following manner; the rotation of the nut is prevented so that it can move only linearly, the screw is rotated and the rotation of the screw is transmitted to the nut to perform the linear movement. When the direction of rotation of the screw is changed, the direction of linear movement of the nut is reversed. It is also possible to allow only linear movement of the screw, and during rotation of the nut the screw will perform the linear movement.

The movement with the worm-worm wheel transmission is performed in the following manner; the worm is rotated and rotates the worm wheel. With a change of direction of rotation of the worm, the direction of rotation of the worm wheel is reversed.

A common feature of the above transmissions types are that they have a self-locking property, regardless of the nature of loading from an object to be moved. The loading of the object to be moved can be a resilient resistance or an external force such as a gravity force in the direction of movement. A self-locking transmission prevents undesired displacements in the transmissions. When a movement between a driving element and a driven element is performed frictional interaction substantially reduces the efficiency of such transmissions. Even with the use of lubricant the efficiency cannot be increased substantially.

A method of stepped movement of a self-locking transmission is known from my Soviet Inventor's Certificate number 1,401,209 (1986). This method includes causing oscillation of the driving element, a movement of the controlling element which is a screw in the screw-nut transmission in the phase of an idle running, and stopping of the controlling element in the phase of working running. Here a difference in the speeds of the driving and driven elements is determined. The direction of movement of the controlling element is changed during reversing of the movement of the driving element at the moment of negative difference of the speeds of the driving and driven elements. The controlling element is rolled or rotated over the driven element with the speed of movement of the controlling element equal or higher than the speed of movement of the driven element in the phase of an idle running. The controlling element is rolled over the driven element before stopping of the controlling element in phase of a working running. This known method is complicated since it requires additional change of the speed of the driving and driven elements. Moreover, the influence of a load, here a resilient force, prevents unloading of the controlling element. A negative difference in the speeds of the driving and driven elements is not provided.

A method of moving objects with a self-locking transmission is disclosed in my a Soviet Inventor's Certificate number 1,486,686 (1989). In accordance with this method, oscillations of a driving element in a self-locking transmission are generated. The element that is oscillated is a worm support in the worm—worm wheel transmission. A controlling element (a worm in a worm—worm wheel transmission) is displaced relative to the driven element in a phase of idle movement by low power motor. The lower power motor is braked and unbraked for the change of direction of oscillations of the controlling element. However, the use of the low power motor can only provide substantial power with a low movement speed. Thus, this motor does not provide efficient operation of a self-locking mechanical transmission. The presence of a torque on the motor during contacting of the driving and driven element does not lead to the braking of the driving element, and causes additional frictional interaction of the driving element with the driven element thereby reducing the efficiency of mechanical transmission. This also causes undesirable additional movements. Insufficiently fast interaction of the low power motor also does not provide a return of the driving element to an initial position. In addition to the change in the magnitude of movement the method leads to shocks and noise. Moreover, the influence of a load, for example resilient forces, causes constant braking by the driven element (screw in the screw-nut transmission or a worm wheel in the worm—worm wheel transmission) of the controlling element, whose unbraking becomes impossible for providing idle running.

In the above described methods, at the beginning of the working stroke there is always a gap between the driving element and the driven element, which leads to strikes, substantially reduces the reliability of operation of the transmission, and also causes noise. It is not always necessary to move the driving element back in the direction of a preceding position. However, when these known methods use oscillation one must return the driving element to the preceding position. Moving a driving element and a driven element only in the direction of travel of an object does not maintain a self-locking relationship between driving and driven elements. Also, it substantially reduces the reliability of operation of the transmission.

SUMMARY OF THE INVENTION

Accordingly, it is an object of the present invention to provide a method of moving objects with a self-locking mechanical transmission, which avoids the disadvantages of the prior art.

In accordance with the method the controlling element is moved until a contact is established between the driving element and the driven element. A power stroke is applied to one of said elements so that the driving element and the driven element are moved in a direction in which the contact is established. The controlling element is then unloaded to interrupt a power interaction between the driving element and the driven element. The controlling element is then moved without interaction between the driving element and the driven element.

When the method is performed in accordance with the present invention, a gapless interaction of the driving and driven elements during transmission of mechanical energy (force or torque) is provided for performing the movement. This increases the reliability and reduces noise. The movement in direction of contact between the driving and driven elements contribute to the self-locking feature, resulting in more reliable operation and higher efficiency. Also, the absence of a gap during the working or power stroke increases movement accuracy of the driven element. The use in the inventive method of displacing the controlling element without an interaction a power between of the driving element and the driven element makes possible regulation of movement parameters independently. For example, the pitch and the speed of movement may be independently controlled. The method promotes free motion of the driven element and prevents motion of the driving element after unloading of the controlling element. The power unloading of the controlling element facilitates its controlling and at the same time reduces energy consumption for control, decreases a force for unlocking and increases efficiency. Numerous variants of movement of the controlling element can be performed so that various constructions can be designed based on the inventive method. Each variation would have specific advantages. Also a great range of speed is provided due to reduction of resistance to the movement of controlling element.

The step of moving the driving element in the direction of its preceding position increases the range of travel of the driven object joined to the driven element without requiring a change in the coordinate of the application of the power action to the driving element.

The novel features which are considered as characteristics for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
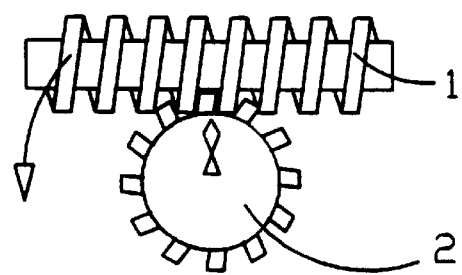
FIG. 1 shows a method in accordance with the present invention, in which an initial position of a worm and a worm wheel is illustrated with contact between them. Torque is applied to the worm relative to an axis of the worm wheel as shown with an arrow, and an indicator of the worm wheel position is also shown.

Essentially, the inventive method relates to a method of moving a driven element having gear teeth by a driving element which also has gear teeth. The power stroke occurs without relative movement between the gear teeth of the driven and driving elements. Thus, the power stroke as shown in the FIG. 1–FIG. 4 embodiment includes driving a worm about the axis of the worm gear with the teeth of the worm and worm gear in locking interaction. This movement is shown between FIGS. 1 and 2. Similarly, as shown in FIGS. 5–8, the driving element may be the nut 4 with the driven element being a screw 3. As shown, the power stroke illustrated by the arrow in FIG. 5 involves an axial application of movement to the nut 4 thus driving the screw 3. Again, there is no relative movement between the gear teeth and the nut 4 and on the screw 3. The embodiment shown in FIGS. 9 and 10 reverses the drive and driven elements from the worm and worm gear embodiment, but operate under the same general principal. The embodiment shown in FIGS. 11–14 reverses to the driving and driven elements of the nut and screw, but operates under similar principles.

The inventive aspects of this method include taking up the gap between the drive and driven element gear teeth prior to the application of the power stroke. In several of the preferred ways of taking up the gap, there is movement of a controlling element, which is selected between the drive and driven element, in a direction which is distinct from the direction of the power source. As one example, in one way of taking up the gap between worm 1 and worm gear 2, the worm is rotated about its axis until there is contact between the worm 1 and the worm gear 2. At that time, the power stroke occurs with driving the worm 1 about the axis of the worm gear 2. In that sense, the movement to pick up the gap and move into contact between the worm and worm gear 2 occurs in a different direction than the power stroke, other examples will be disclosed. Moreover, there is relative movement between the gear teeth of the worm 1 driving element and the worm gear 2 driven element in the movement to take up contact. There are several other methods of taking up contact which will be disclosed below.

Methods of moving objects with a self-locking mechanical transmission are illustrated with two self-locking mechanical transmissions as examples. A first self-locking type of mechanical transmission includes a worm 1 and a worm wheel 2. A second self-locking transmission includes a screw 3 and a nut 4.

The driving and driven elements can be formed as the same elements; however, in various designs they perform various functions and therefore they are identified as different elements. Either the driving or the driven elements can be formed as the controlling element, if one of them has an additional motion freedom of movement.

In according with the method of the present invention, in a first step a controlling element is moved until a contact between the driving element and the driven element is established. With reference to FIGS. 1–4, the driving element is the worm 1, while the driven element is the worm wheel 2. With reference to FIGS. 5–8, the driving element is the nut 4 and the driven element is the screw 3.

In the FIGS. 1–8 examples, a controlling element is the driving element.

In FIGS. 1–4, the driving element worm 1 is moved to be brought into contact with the driven element worm wheel 2 by rolling of the driving element relative to the driven element. In the FIGS. 5–8 embodiment, the driving element nut 4 is moved into contact with the driven element screw 3 by rolling the nut on the screw. For performing the rolling the driving element such as the worm 1 or the nut 4 is rotated about its axis.

A second variant of bringing the driving element into contact with the driven element is to perform a rectilinear movement of the driving element. For making a contact, the driving element or the nut 4 is moved in direction of its axis of rotation.

Another variant of bringing the driving element into contact with the driven element is performed by turning the driving element relative to an axis of the driven element. For this purpose the worm 1 is rotated relative to the rotary axis of the worm wheel 2 or the nut 4 is rotated relative to the rotary axis of the screw 3. In this case the rotary axes of the screw and nut can coincide, and when the internal diameter of the nut is greater than the external diameter of the screw and the screw interacts with the nut only with one external surface, the axes of the screw and nut are parallel.

In according with still a further variant, the movement for bringing the driving element into contact with the driven element is performed by rolling of the driving element relative to the driven element simultaneously with a rectilinear movement of the driving element. For this purpose the nut 4 is rotated relative to its axis of rotation, and simultaneously moved rectilinearly in direction of its axis.

A further variant of the inventive method is that the driving element is moved for bringing it in contact with the driven element by rolling of the driving element relative to the driven element, simultaneously with rotating of the driving element relative to an axis of the driven element. For this purpose, the worm 1 is rotated relative to its axis of rotation and simultaneously rotated relative to the axis of rotation of the worm wheel 2. Similarly, the nut 4 is rotated around its axis of rotation and simultaneously it is rotated relative to the axis of rotation of the screw 3.

The purpose of the movement of the driving element as a controlling element until it is brought in contact with the driven element is to eliminate the gap between the driving and the driven elements. This can be performed by a low force or a low torque drive.

When the driving element is the worm wheel 2 or the screw 3. The driven element is then worm 1 or nut 4. The controlling element may also be the driven element.

Worm 1 as the driven controlling element is moved into contact with the driving element worm wheel 2 by rolling of the driven element relative to the driving element. The driven element nut 4 is moved into contact with the driving element or screw 3 by rolling of the nut on the screw. For performing the rolling, the driven element such as the worm 1 or the nut 4 is rotated about its axis.

A second variant of bringing the driven element into contact with the driving element is to perform a rectilinear movement of the driven element. For making a contact, the driven element nut 4 is moved in direction of its axis of rotation.

Another variant of bringing the driven element into contact with the driving element is performed by turning of the driven element to an axis of the driving element. For this purpose worm 1 may be rotated relative to the rotary axis of the worm wheel 2. Nut 4 may be rotated relative to the axis of screw 3. In this case the rotary axes of the screw and nut can coincide. When the internal diameter of the nut is greater than the external diameter of the screw the screw interacts with the nut only at one point on the external surface. In such a case, the axes of the screw and nut are parallel.

In according with still a further variant, the movement of the driven element into contact with the driving element is performed by rolling the driven element relative to the driving element simultaneously with a rectilinear movement of the driving element. For this purpose the nut 4 is rotated relative to its axis of rotation, and simultaneously moved rectilinearly in direction of its axis.

A further variant of the inventive method is that the driven element is moved into contact with the driving element by rolling the driven element relative to the own axis simultaneously with rotating the driven element relative to an axis of the driving element. For this purpose, the worm 1 is rotated relative to its axis of rotation and simultaneously it is rotated relative to the axis of rotation of the worm wheel 2. The nut 4 is rotated around its axis of rotation and simultaneously moved rectilinearly in direction of its axis.

The purpose of the movement of the driven element as a controlling element until it is brought into contact with the driving element is to eliminate the gap between the driving and the driven elements. This can be performed by a low force or a low torque drive.

The second step of the inventive method includes applying a power action to the driving element and simultaneously jointly move the driven element in direction of the established contact between the driving element and the driven element.

In FIGS. 1–4, the driving element is the worm 1, while the driven element is the worm wheel 2. In FIGS. 5–8 the driving element is nut 4 and the driven element is screw 3.

Figure 2:
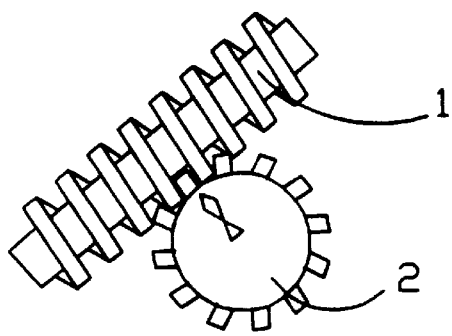
FIG. 2 shows an end position of the worm and the worm wheel after the joint power movement in direction of a contact therebetween.
Figure 4:
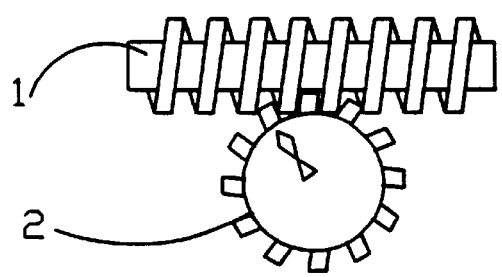
FIG. 4 is a view showing a position of the worm after its movement toward the preceding position shown in FIG. 1.

For this purpose the worm 1 is rotated about the axis of the worm wheel 2 in direction of forming contact there between as shown in FIG. 1, and thereby the worm wheel 2 is rotated around its rotary axis. The nut 4 is also moved along its axis of rotation shown in FIG. 5, and thereby the screw 3 is moved in direction of its rotary axis.

Figure 5:
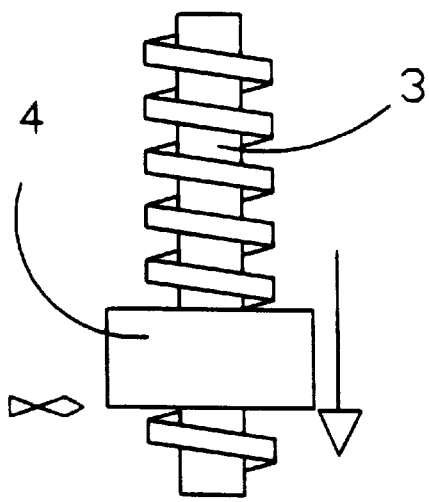
FIG. 5 is a view showing a method in according with the present invention with an initial position of a screw and a nut which are already in contact with one another. An arrow shows a power interaction applied to the nut in direction of contact between the nut and screw. An indicator is shown near the nut illustrating the position of the nut.

During the movements shows in FIGS. 1 and 5, normal forces are utilized. In other words, during this power movement there are no relative movements of the driving and driven elements. This movement thus has a maximal efficiency. This operation provides movement of an object attached to the driven element (not shown in the drawing), from the movement of the driven element.

Figure 9:
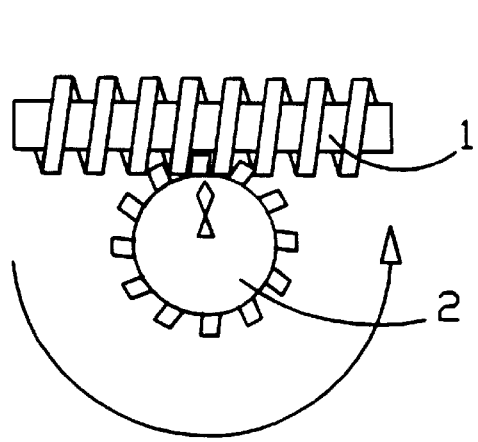
FIG. 9 shows a method in accordance with the present invention, in which an initial position of a worm and a worm wheel is illustrated with contact between them. Torque is applied to the worm wheel relative to an axis of the worm wheel as shown with an arrow. An indicator of the worm wheel position is also shown.

The driving element may be the worm wheel 2 or the screw 3, while the driven element may be the worm 1 or the nut 4. For this purpose the worm wheel 2 is rotated about its axis in direction of forming contact there between as shown in FIG. 9. Thereby, the worm wheel 2 is rotated around its rotary axis. The screw 3 is also moved along its axis of rotation shown in FIG. 11, and thereby the nut 4 is moved in the direction of its rotary axis.

Figure 11:
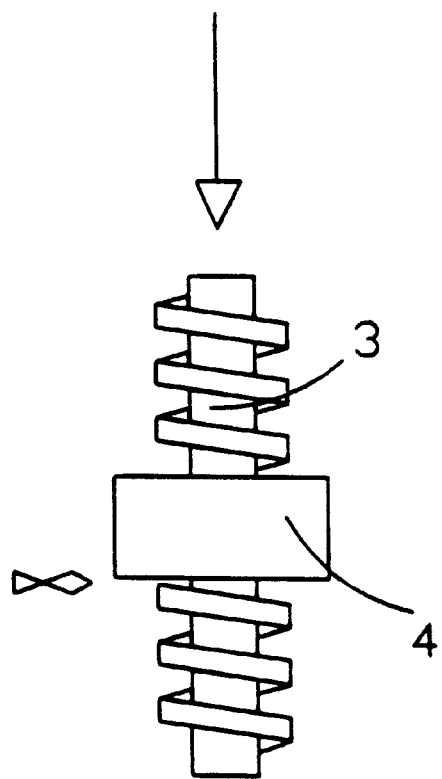
FIG. 11 is a view showing a method in according with the present invention with an initial position of a screw and a nut which are already in contact with one another. An arrow shows a power interaction applied to the screw in direction of contact between the nut and screw. An indicator is shown near the nut illustrating the position of the nut.

During the movements shows in FIGS. 9 and 11, normal forces are utilized. In other words, during this movement there are no relative movements of the driving and driven elements. This movement thus has a maximal efficiency. This operation provides movement of an object attached to the driven element, from the movement of the driven element.

A third step of the inventive method includes unloading of the controlling element so as to interrupt a power interaction (force-transmitting connection) between the driving element and the driven element. The driving element such as the worm 1 or the nut 4 is unloaded by preventing a reverse stroke of the driven element that is being pushed, or in other words a reverse stroke of the worm wheel 2 or the screw 3 is prevented. This is achieved by arranging an additional stop (not shown) which prevents the reverse stroke of the driven element. In FIGS. 1–8, the driving element, such as the worm 1 or the nut 4 is unloaded so as to contribute to a further stroke of the element that is being pushed or in other words the worm wheel 2 or the screw 3.

When the driving element is the worm wheel 2 or the screw 3 the driving element is unloaded by preventing a reverse stroke of the driven element that is being pushed, or in other words a reverse stroke of the wheel 1 or the nut 4 is prevented. This is achieved by arranging an additional stop (not shown) which prevents the reverse stroke of the driven element. The driving element, such as the worm wheel 2 or the screw 3 is unloaded so as to contribute to a further stroke of the element that is being pushed or in other words the worm 1 or the nut 4.

In this case inertia forces are utilized, and insignificant obstacles for free further movement of the driven object to be moved are unpredictable. The driving element is unloaded by preventing a reverse stroke of the driven element which is being pushed so as to simultaneously contribute to a further stroke of the driven element which is being pushed. Unloading of the controlling element includes moving the driving element in the direction of a preceding position with a speed that is greater than speed of the driven element in the same direction.

A fourth step of the inventive method includes displacing the controlling element without an interaction of power between the driving element and the driven element. The displacing of the controlling element without an interaction of power between the driving element and the driven element includes rolling of the driving element relative to the driven element. Since the controlling element in this step is already unloaded, only insignificant energy is spent on its movement that is many times (tenth and hundredth times) lower than the energy consumed for the joint power movement of the driving and driven elements.

This will be explained with the driving element being the worm 1 or the nut 4, while the driven element is the worm wheel 2 or the screw 3. A controlling element is a driving element.

Figure 3:
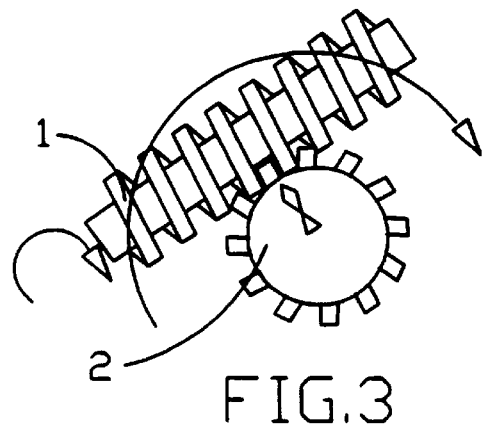
FIG. 3 is a view showing an initial position of the worm and the worm wheel after the worm is unloaded and a power interaction between them is interrupted. Arrows show torque applied relative to axes of the worm and the worm wheel correspondingly.
Figure 7:
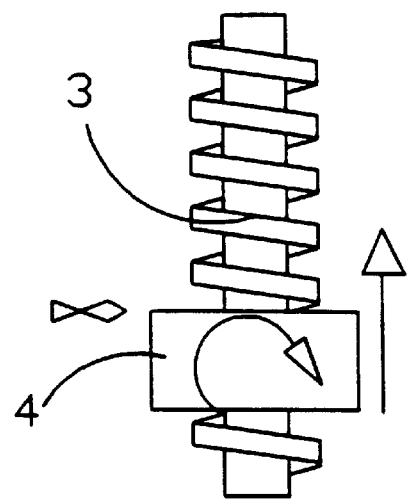
FIG. 7 is a view showing an initial position of the screw and nut after unloading of the screw and interruption of a power interaction between the screw and the nut. Arrows show a torque applied to the screw and a force applied to the nut.
Figure 6:
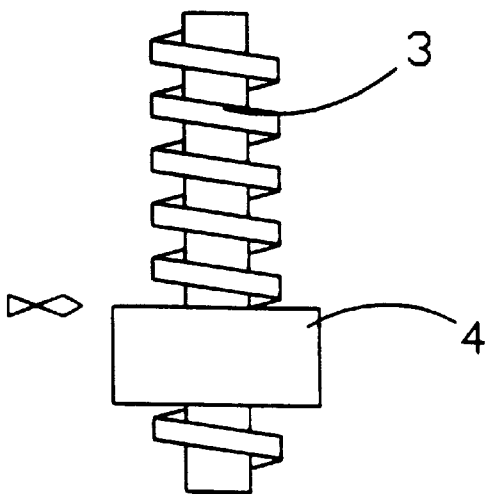
FIG. 6 is a view showing an end position of the screw and the nut after their joint power movement.
Figure 8:
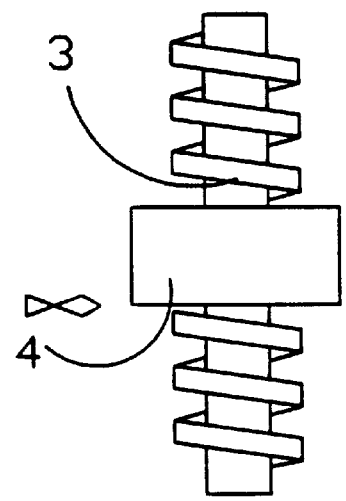
FIG. 8 is a view showing a position of the screw and the nut after a return of the nut in direction of the preceding position shown in FIG. 5.

For performing the above described movement, the worm 1 is rotated about its axis of rotation, and the nut 4 is rotated about its axis of rotation, as shown in FIGS. 3 and 7.

As other examples, the driving element may be the worm wheel 2 or the screw 3, while the driven element may be the worm 1 or the nut 4. A controlling element is a driven element.

Figure 10:
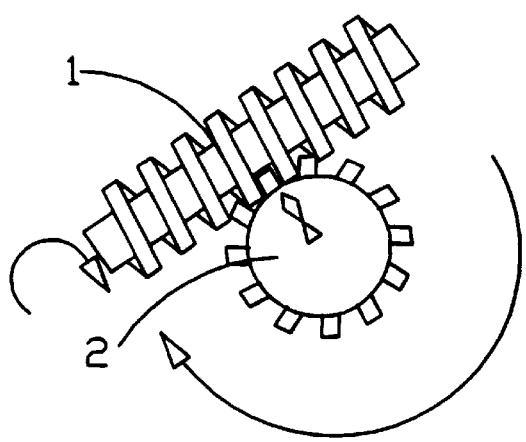
FIG. 10 is a view showing an initial position of the worm and the worm wheel after the worm is unloaded and a power interaction between them is interrupted. Arrows show torque applied relative to axes of the worm and the worm wheel correspondingly.
Figure 13:
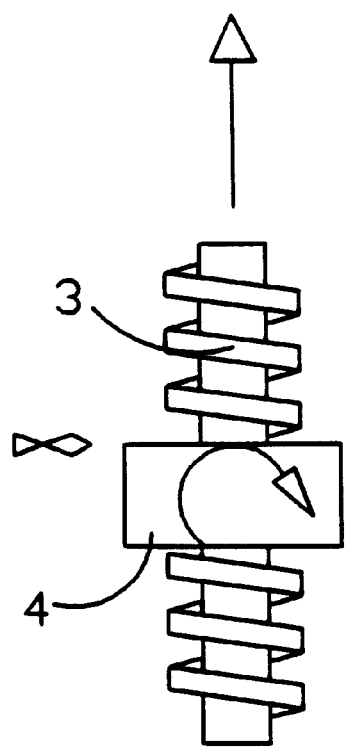
FIG. 13 is a view showing an initial position of the screw and nut after unloading of the screw and interruption of a power interaction between the screw and the nut. Arrows show a torque applied to the nut and a force applied to the screw.
Figure 12:
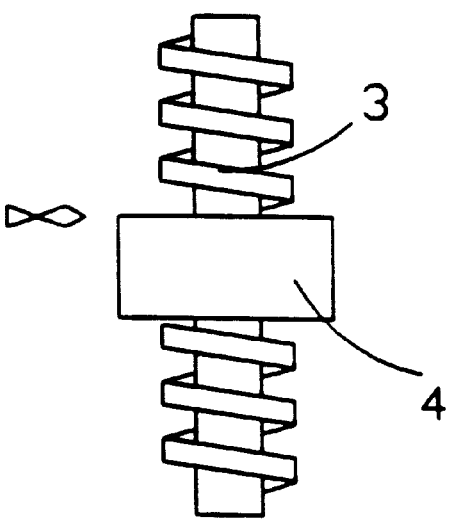
FIG. 12 is a view showing an end position of the screw and the nut after their joint movement.
Figure 14:
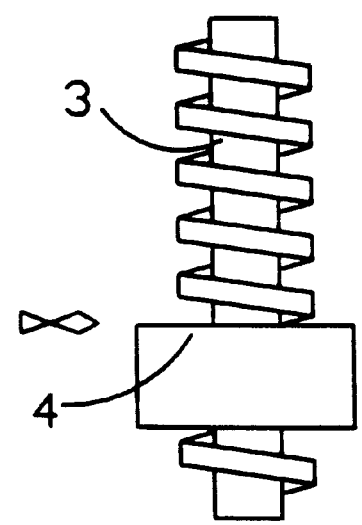
FIG. 14 is a view showing a position of the screw and the nut after a return of the nut in direction of the preceding position shown in FIG. 11.

For performing the above described movement, the worm 1 is rotated about the its axis of rotation, and the nut 4 is rotated about the its axis of rotation, as shown in FIGS. 10 and 13.

A fifth step of the inventive method includes the step of moving the driving element in the direction of a preceding position.

When we have one action of moving an object with self-locking mechanical transmission, or a source of a power moves jointly with the driving element then we do not need this step of moving the driving element in direction of a preceding position.

When we have to maintain a set coordinate for applying the power action, we must return the driving element to the coordinate of its preceding position exactly.

If the amount of movement of the driving element in direction of a preceding position is less than the size of a gap between the convolutions (teeth) of the driving element and the teeth (convolutions) of the driven element, moving of the driving element in direction of a preceding position can be the reverse of the power movement of the driving element and the driven element in direction of the established contact between the driving element and the driven element.

If the controlling element is the driving element, moving the driving element in direction of a preceding position can be combined with displacing the controlling element without an interaction a power between the driving element and the driven element.

If the controlling element is the driven element, moving of the driving element in direction of a preceding position can be back to front of moving the driving element and the driven element in direction of the established the contact between the driving element and the driven element.

During performing of the periodical sequence of the steps in accordance with the new method, it is possible to obtain both discrete (stepped) directional linear or rotary movement of the object, as well as a continuous linear or rotary movement.

SUMMARY, RAMIFICATIONS AND SCOPE

It will be understood that each of the elements described above, or two or more together, may also find a useful application in methods differing from the types described above.

The method is provided for performing movement, and increases the reliability and reduces nose. The movement contribute to the self-locking, more reliable operation and higher efficiency. The method permits increased movement accuracy of the driven element. The inventive method makes possible regulation of movement parameters independently, for example a pitch and a speed of movement. The method promotes a free motion of the driven element and prevents motion of the driving element after unloading of the controlling element. The power unloading of the controlling element facilitates its control and at the same time reduces energy consumption for control, decreases a force for unlocking and increases efficiency. Numerous variants of movement of the controlling element can be performed so that various constructions can be designed based on the inventive method with specific advantages. Also a great range of speed due to reduction of resistance to the movement of controlling element is provided.

The novel features which are considered as characteristics for the invention are set forth in particular in the appended claims.

While the invention has illustrated and described as embodied in a method of moving objects with self-locking mechanical transmission, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of transmitting motion using a self-locking transmission comprising the steps of:
   (1) providing a driving and driven element, and selecting one of said driving and driven elements as a controlling element, said driving and said driven elements each having gear engagement members centered on respective axes;
   (2) moving said controlling element in a first direction until said gear engagement including rotation about the axis of one of said driving and driven elements; and
   (3) then moving said driving and driven elements together without relative movement in a second direction which is distinct from said first direction, and the movement including rotation about the axis of the other of said driving and driven elements.

2. A method as recited in claim 1, wherein said driving and driven elements include a worm and worm gear combination, and said gear teeth of said driving and driven element are on non-parallel axes.

3. A method as recited in claim 1, wherein said controlling element is said driving element.

4. A method of transmitting motion using a self-locking transmission comprising the steps of:
   (1) providing a driving and driven element, and selecting one of said driving and driven elements as a controlling element, said driving and said driven elements each having gear engagement members centered on respective axes;
   (2) moving said controlling element in a first linear direction until said gear engagement members of said driving and driven elements are in contact, the movement including rotating said controlling element about its axis to take up any gap between said gear engagement members of said driving and driven elements; and
   (3) then moving driving and driven elements together without relative movement in a second linear direction which is distinct from said first linear direction, said movement including linear movement of said driving and driven elements.

5. A method as recited in claim 4, wherein one of said driving and driven elements is a screw and the other of said driving and driven elements is a nut.

6. A method as recited in claim 4, wherein said controlling element is said driven element.

7. A method as recited in claim 4, wherein said controlling element is said driving element.

8. A method as recited in claim 4, wherein said driving element has movement in the direction of a preceding position.

* * * * *